Figure 1:
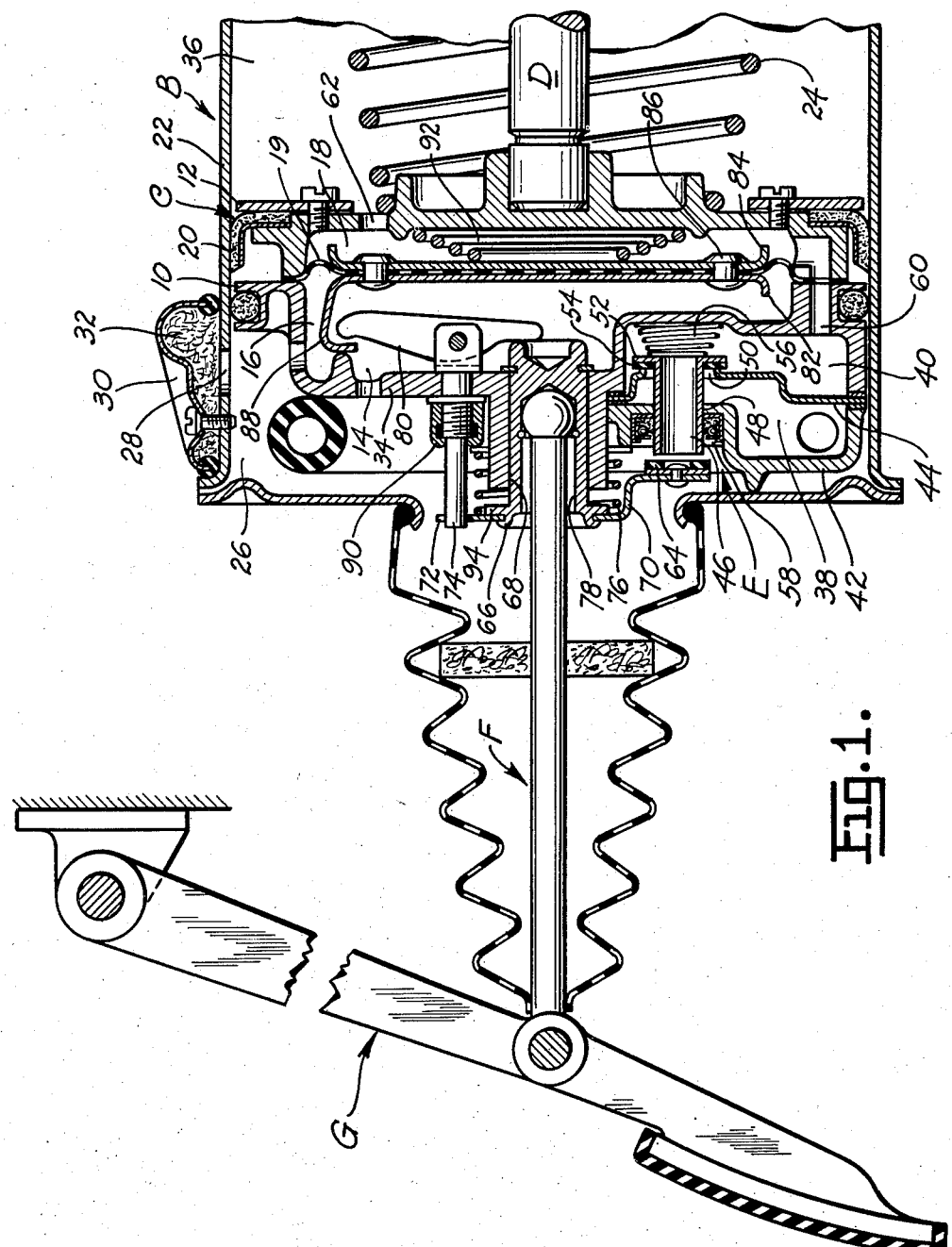

March 11, 1958  E. R. PRICE  2,826,177
PNEUMATIC SERVO-MOTOR
Filed April 25, 1956  2 Sheets-Sheet 1

INVENTOR.
EARL R. PRICE.
BY
William P. Hickey
ATTORNEY.

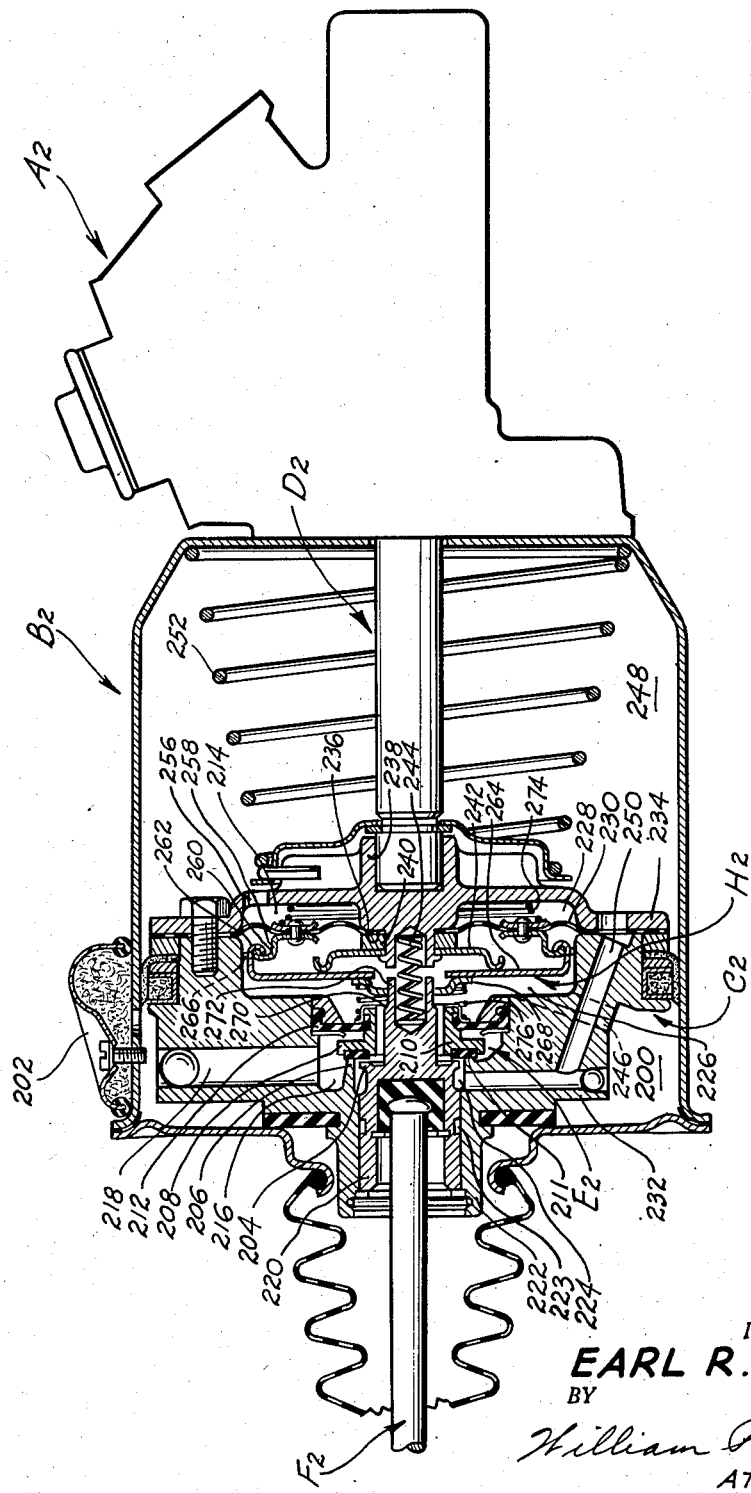

United States Patent Office

2,826,177
Patented Mar. 11, 1958

2,826,177

PNEUMATIC SERVO-MOTOR

Earl R. Price, South Bend, Ind., assignor to Bendix Aviation Corporation, South Bend, Ind., a corporation of Delaware Application April 25, 1956, Serial No. 580,624

4 Claims. (Cl. 121—41)

The present invention relates to pneumatic powered servo-motors; and more particularly to pneumatic power operated master cylinder units for the braking systems of automobiles and the like which units are of the type having an internal control valve and reaction diaphragm arranged such that the diaphragm opposes valve actuating movement.

Power operated master cylinder units of the above mentioned type have been used commercially for a number of years. In the conventional braking system in which they are employed, a foot pedal lever is usually used to control the operation of the power operated master cylinder unit. The units with which we are more particularly concerned, also utilize this foot pedal lever to actuate the braking system of the automobile manually upon failure of the servo-motor.

Present day market trends in the automotive field are directed toward providing increased driving ease and comfort; and it is, therefore, desirable to couple power operated master cylinder units with foot pedal leverage systems having considerable mechanical advantage in order that the braking systems can be operated manually without undue physical strain by the operator. Increasing the mechanical advantage of the foot pedal leverage system has the disadvantage, however, of decreasing the reaction felt by the foot of the operator during power operation of the unit. It is desirable therefore that any increase in mechanical advantage of the foot pedal leverage system be accompanied by an increase in the effectiveness of the diaphragm reaction system. Increased effectiveness of the diaphragm reaction system as brought about by increased diaphragm size, lacks expediency in many instances because of space considerations and other factors, and a more satisfactory solution of this problem is needed.

An object of the present invention, therefore, is the provision of a new and improved pneumatic power operated servo-motor of the above described type having a diaphragm reaction system capable of developing greater reactions than have been developed heretofore by diaphragm units of a comparable size.

Another object of the invention is the provision of a new and improved diaphragm reaction system of increased effectiveness for servo-motors of the above described type, which systems are rugged in design, efficient in operation, and inexpensive to manufacture.

A further object of the invention is the provision of a new and improved pneumatic powered servo-motor having an internal piston chamber provided with an internal diaphragm, valve means for controlling the operation of the motor, a movable control member for actuating the valve means and projecting into the internal piston chamber, and a system of levers positioned in said internal chamber and operatively connected between said movable control member and the diaphragm for transferring reaction from the diaphragm to the movable control member.

The invention resides in certain constructions, combinations, and arrangements of parts; and further objects and advantages will be apparent from the following description of the preferred embodiments described with reference to the accompanying drawings forming a part of this specification and in which:

Figure 1 is a longitudinal cross-sectional view of one embodiment of the invention; and Figure 2 is a longitudinal cross-sectional view of a second embodiment of the invention.

Referring now to Figure 1 of the drawings, there is shown therein a power operated hydraulic master cylinder unit for automotive braking systems and the like. The unit generally comprises a hydraulic master cylinder unit (not shown) attached to one end of a fluid pressure servo-motor B having an internal piston C connected to one end of a force transmitting member or piston rod D which extends into the master cylinder for displacing hydraulic fluid therefrom. Movement of the power piston C is controlled by valve structure E mounted on the forward face of the piston C, and which valve structure is in turn actuated by a push rod F interconnecting the operative elements of the control valve E and the brake applying foot pedal leverage G of an automobile. The master cylinder (not shown) is of well known construction and will not be described—for a detailed description, see the Earl R. Price et al. application Serial No. 513,514, filed June 6, 1955.

The servo-motor B shown in the drawing is a normally atmospheric submerged unit; that is, a unit in which atmospheric pressure normally exists on both sides of its power piston, and to one side of which piston vacuum is communicated to power actuate the unit.

The power piston C of the servo-motor is formed in two sections 10 and 12 to provide an internal piston chamber 14 which is divided into forwardly and rearwardly opposed chambers 16 and 18 respectively by a diaphragm 19, the outer edges of which are clamped between the piston sections by means of machine screws (not shown). The outer edge of the piston is provided with a suitable seal 20 for effecting a seal with respect to the cylinder walls 22; and a spring 24 positioned between the end of the cylinder and the piston C biases the piston C to its forward position shown in the drawings (i. e. to the end of the motor adjacent the foot pedal lever).

Atmospheric pressure is continually admitted to the forward face of the piston (i. e. the front power cylinder chamber 26) through an opening 28 in the top of the cylinder wall 22. Dirt and water are prevented from entering the opening by means of filter material 30 held over the opening by a splash proof enclosure 32 bolted to the cylinder wall.

Actuation of the servo-motor B is controlled by the valve structure E mounted on the front piston wall 34 of the piston C, and adapted to regulate both atmospheric and vacuum communication with the rear power chamber 36. The valve structure E comprises an axially outer vacuum chamber 38 and an axially inner control chamber 40 housed within a cover plate 42 bolted to the front face of the piston. The outer vacuum chamber 38 and the inner control chamber 40 are separated by a partition member 44 sealingly clamped between the cover plate 42 and piston C; and an atmospheric poppet tube 46 extends through openings 48 and 50 in the cover plate 42 and partition member 44, respectively, to communicate atmospheric pressure from the front cylinder chamber 26 to the inner control chamber 40 of the valve.

The opening 50 in the partition member 44 in effect forms a vacuum port between the vacuum and control chambers, and the portion of the tube 46 within the control chamber is flared over to provide a flange 52 for closing off the opening 50 through which the tube 46 extends. The flange 52 is coated with a resilient material 54 for effecting a seal with respect to the portion of the partition member 44 surrounding the opening 50, and a coil spring 56 normally biases the tube 46 forwardly to close the vacuum port or opening 50. A suitable seal 58 is provided in the cover plate 42 surrounding the tube 46 to effectively guide the tube 46 for axial movement, and at the same time prevent loss of vacuum from the vacuum chamber 38 to the front power chamber 26.

Atmospheric communication between the front power cylinder chamber 26 and the rear power chamber 36 through atmospheric poppet tube 46, control chamber 40, passage 60, rearwardly opposed piston chamber 18, and passage 62 is controlled by an atmospheric poppet 64 overlying the forward end of the tube 46. The atmospheric poppet 64 is supported from a cylindrically shaped valve control member 66 slidably received in an axially extending bore 68 in the front wall 34 of the piston C. The atmospheric poppet support plate 70 attached to the forward end of the control member 66 is apertured at 72 to receive a guide post 74 for preventing misalignment of the atmospheric poppet 64 from the atmospheric poppet tube 46; and the control member 66 is biased forwardly to hold the atmospheric poppet 64 in its open position away from tube 46 by a coil spring 76. The forward end of the control member is recessed as at 78 to receive the spherical end of the push rod F which in turn is operatively connected to the brake pedal lever G of the automotive vehicle.

As previously indicated the servo-motor B is adapted to provide "reaction" or "feel" to the foot of the operator indicative of the amount of force being delivered to the piston rod D. This is accomplished by means of the diaphragm 19 and the reaction levers 80. The center portion of the diaphragm 19 is stiffened by diaphragm plates 82 and 84 positioned on the front and rear sides of the diaphragm respectively and held in place by rivets 86. The outer edge of the front plate 84 is provided with three equally spaced, forwardly projecting fingers or hooks 88 adapted to receive the outer end of the reaction levers 80. The inner end of each of the reaction levers 80 bears against the rear of control member 66, and each of the levers is pivotally supported intermediate its ends by a bifurcated post 74 which is fastened to the front wall 34 of the piston by means of a nut 90.

In the normal or de-energized condition of the servo-motor, atmospheric pressure exists on both sides of the diaphragm 19; and upon energization of the servo-motor, vacuum is communicated with the rear piston chamber 18 to move the diaphragm rearwardly. Initial rearward movement of the diaphragm 19 is delayed by a counter reaction spring 92 until a predetermined vacuum is exerted across piston C for reasons well known in the art; and manual application of the brakes is effected during vacuum failure by means of a stop 94 on the valve control member 66 which is adapted to bottom out upon the front face of the piston C.

As shown in the drawing, the servo-motor B is in its normal de-energized condition, with the control member 66 in its forward position and atmospheric pressure against both sides of the piston C. Upon depressing the foot pedal lever G, push rod F forces the valve control member 66 inwardly causing the atmospheric poppet 64 to close off the front end of the atmospheric tube 46. Continued rearward movement of the poppet 64, slides the tube 46 rearwardly to open the vacuum port 50 and admit vacuum to the rear side of the piston C to cause the piston C to move rearwardly and apply the brakes of the vehicle. When the desired degree of brake application is effected, rearward movement of the foot pedal lever G is stopped, whereupon the valve partition member 44 is moved into engagement with flange 52 of the atmospheric tube 56 to prevent further vacuum intensification in the rear power chamber 36. The brakes may be de-energized any desired amount by permitting the foot pedal lever G to move forwardly a desired amount whereupon the atmospheric poppet 64 uncovers the atmospheric tube 46 and permits pressure to flow to the rear power chamber 36. Pressure build up in the rear power chamber 36 permits the piston C to move forwardly and the atmospheric tube 46 to again abut the atmospheric poppet 64. Complete retraction of the foot pedal lever G, of course, permits the atmospheric poppet 64 to remain off of its atmospheric tube 46, piston C to be fully retracted, and atmospheric pressure to be continually communicated to the back side of the piston C.

As previously indicated reaction is provided by the diaphragm 19. Initial movement of the diaphragm 19 is delayed by the counter reaction spring 92 until a predetermined pressure differential is exerted across the diaphragm. This point will generally be reached when the vehicle's brake shoes contact their brake drums, and thereafter further intensification of the pressure differential moves the diaphragm 19 rearwardly causing fingers 88 to pull the outer edges of the reaction levers 80 rearwardly and their inner ends to exert a forward force against the valve control member 66. It will be seen from the drawing, that the levers 80 are pivotally supported at a point closer to control member 66 than to the fingers 88 and that the reactive force applied to control member 66, therefore, will be greater than the force developed by the diaphragm.

Figure 2 represents a second embodiment of the invention having portions designated by the same reference numeral as the corresponding portion of Figure 1, characterized further in that the suffix 2 is affixed thereto.

The servo-motor $B_2$ is an atmospheric suspended unit in which atmospheric pressure is always supplied the forward power chamber 200 via air cleaner 202. The control valve structure $E_2$ comprises a pair of concentric valve seats 204 and 206, each of which are adapted to be abutted by a single valve closure member 208. The valve closure member 208 is a sleeve like structure 210 having a flange 211 coated with resilient material on its forward face for abutment with the valve seats. A flexible diaphragm 212 interconnects the rear end of the sleeve 210 with the side walls of the internal piston chamber 214 closing off a portion of the same to provide a vacuum chamber 216. Manifold vacuum is communicated to the vacuum chamber 216 via passage 218 and a flexible connection, not shown, extending externally of the side walls of the servo-motor $B_2$.

The inner concentric valve seat 204 is carried by a movable valve control member 220 slidably mounted in a concentric annular boss 222 on the forward face of the piston $C_2$; and an O-ring 223 is provided thereon to prevent atmospheric pressure from leaking past the control member 222 to reach the annular space 224 between the concentric valve seats 204 and 206.

The internal piston chamber 214 is divided into forward and rearward diaphragm chambers 226, 228 by annular reaction diaphragm 230. The outer edge of the reaction diaphragm 230 is clamped between front and back sections 232, 234 of the piston $C_2$. The inner edge of the diaphragm 230 is clamped between a shoulder 236 on a forwardly projecting boss 238 on the back wall of the internal piston chamber 214 and a retaining ring 240. The retaining ring 240 is in turn held onto the boss 238 by an abutment plate 242 against which the forward end of the boss is peened.

A spring 244 is interposed between boss 238 and valve control member 220 to urge it into its normal or most forwardly position (that shown in Figure 2). Atmospheric pressure from the forward power chamber 200 is continually conducted to the forward diaphragm chamber 226 via passage 246. With the control member 220 in its normal position (that shown in Figure 2) atmospheric pressure is communicated to the annular space 224 between the seats 204 and 206 and then to the rearward power chamber 248 via passage 250 to provide the normal atmospheric suspended condition of the servomotor.

Upon depressing the foot pedal lever, not shown, rod $F_2$ forces valve control member 220 rearwardly causing inner valve seat 204 to abut valve closure member 208 and move it from the outer valve seat 206. Vacuum is thereupon admitted to the annular space 224 between seats 204 and 206 and thence to the rearward power chamber 248 causing the piston to move rearwardly. Rearward movement of the piston $C_2$ carries the outer valve seat 206 carried by the piston into engagement again with the valve closure member 208 to "lap" the valve and prevent further rearward movement of the piston $C_2$. Upon releasing the foot pedal lever, spring 252 suitably interpositioned between the piston rod $D_2$ and the end of the power cylinder, in conjunction with hydraulic pressure from the master cylinder $A_2$, returns the piston $C_2$ to its forward position. Spring 244 interpositioned between boss 238 and the movable valve control member 220 opens the atmospheric poppet to again provide the atmospheric suspended condition of the servomotor.

As in the previous embodiment, the present servomotor is provided with a reaction diaphragm 230 coupled with reaction linkages $H_2$ to increase the reactive force or "feel" applied to the foot of the operator. Passage 256 is provided in the rear wall of the piston $C_2$ such that the diaphragm 230 moves rearwardly when vacuum is admitted to the rear power chamber 248. An annular ring 258 having a hooked portion 260 is riveted to the reaction diaphragm 230 to engage the radially outer hooked portion 262 of a plurality of reaction levers or fingers 264.

The reaction levers 264 are separated from each other by radial portions 266 separating the hooked portions 260 of the annular ring 258; and are kept from becoming unhooked from the portions 260 when assembled by abutment with the cylindrical surfaces of the internal piston chamber 214. Rearward movement of the reaction diaphragm 230 pulls the outer edges of the levers 264 rearwardly, causing the levers to pivot about the abutment plate 242, and their radially inner edges to move forwardly. The radially inner edges of the levers 264 causes a ring 268 slidably mounted on a reduced diameter section 272 of the valve control member 220 to move into engagement with the shoulder 270 thereby delivering reaction to the foot of the operator. It will be noted that the abutment surfaces of the abutment plate 242 are positioned closer to the ring 268 than to diaphragm ring 258 thereby increasing the reactive forces developed by the diaphragm. A counter-reaction spring 274 is positioned between diaphragm 230 of the piston to delay delivery of the reactive force until a predetermined force is delivered by the servomotor; and a spring 276 is provided between ring 268 and valve closure member 208 to continually urge it toward its seat.

From the foregoing description of the preferred embodiments of the invention, it will be apparent that the objects heretofore enumerated as well as others have been accomplished. While the preferred embodiments of the invention have been shown and described in detail, the invention is not limited to the particular construction shown or specifically covered by my claims and it is my intention to cover hereby all adaptations, modifications and uses thereof which come within the practice of those skilled in the art to which the invention relates.

I claim:

1. In a fluid pressure servomotor comprising a hollow movable wall provided with an internal chamber having forwardly positioned and rearwardly positioned opposed end walls and which extends across substantially the full width of said movable wall, a diaphragm in said internal chamber dividing said chamber into forwardly and rearwardly positioned opposed chambers adjacent said forwardly and rearwardly positioned end walls respectively, a movable control member carried by said forwardly positioned wall and projecting into said forwardly positioned opposed chamber, valve means in said movable wall and operated by said movable control member for regulating the pressure supplied to one of said opposed chambers thereby producing differential pressure across said diaphragm, said valve means being constructed and arranged such that movement of said movable control member into said forwardly positioned opposed chamber causes said diaphragm to be forced away from said control member, a plurality of levers in said forwardly positioned opposed chamber positioned between said diaphragm and said movable control member, one end of said levers being abutted by said control member, the other end being adapted to be pulled by said diaphragm, and means pivotally supporting points intermediate the ends of said levers from said movable wall, said levers being proportioned to materially increase the reaction on said control member over and above that developed by said diaphragm.

2. In a fluid pressure servomotor comprising a movable wall provided with an internal chamber having spaced forwardly and rearwardly positioned opposed end walls, a movable control member carried by said forwardly positioned wall and projecting into said internal chamber, a projection on said rearwardly positioned wall extending into said chamber toward said movable control member, an annular diaphragm in said chamber extending between said projection and the side walls of said chamber to provide forwardly and rearwardly positioned opposed chambers adjacent the forwardly and rearwardly positioned opposed end walls respectively, valve means in said movable wall and operated by said movable control member for regulating the pressure supplied to one opposed chamber thereby producing differential pressure across said diaphragm, said valve means being constructed and arranged such that movement of said movable control member into said forwardly positioned opposed chamber causes said diaphragm to be moved away from said control member, an annular ring carried by said diaphragm and projecting into said forwardly positioned opposed chamber, an abutment surface carried by said movable control member, a plurality of generally radially extending levers in said forwardly positioned opposed chamber, said levers being adapted to be pulled at their radially outer end by said annular ring and being adapted to be abutted on their radially inner ends by said abutment surface of said control member, and an abutment surface supported by said projection on said rearwardly positioned wall for abutting said levers intermediate their ends, whereby rearward movement of said diaphragm forces the inner ends of said levers against said abutment surface carried by said movable control member.

3. A fluid pressure servomotor comprising a power cylinder having a movable wall, said movable wall having an internal chamber provided with forwardly positioned and rearwardly positioned opposed end walls, said forwardly positioned end wall having an annular valve seat projecting into said chamber, an annular valve closure member sealingly engaging the side walls of said chamber and adapted to abut said valve seat to form an enclosed chamber for receiving fluid at a first pressure level, a movable valve actuating member carried by said forwardly positioned wall and projecting into said internal chamber through said annular valve seat and said annular valve closure member, an annular valve seat on said movable valve actuating member adapted to sealingly abut said annular valve closure member when said actuating member is moved inwardly of said chamber, said annular valve seat on said forwardly positioned end wall and said annular valve seat on said valve actuating member having a space therebetween forming a control chamber, a diaphragm in said internal chamber dividing said chamber into forwardly and rearwardly positioned opposed chambers, said forwardly positioned chamber being in communication with said annular valve seat on said valve actuating member, said movable wall having fluid flow conducting passages communicating said control chamber with said rearwardly positioned opposed chamber, means for conducting fluid to said forwardly positioned opposed chamber at a second pressure level, and a plurality of levers in said forwardly positioned opposed chamber positioned between said diaphragm and said valve actuating member, said levers being operatively connected to said diaphragm, said movable wall, and said valve actuating member at spaced points and being arranged in such manner that changes in differential pressure across said diaphragm resulting from inward movement of said valve actuating member cause said linkages to oppose said inward movement of said valve actuating member, the fulcrum point of said levers being arranged so as to materially increase the reaction on said valve actuating member over and above that developed by said diaphragm.

4. In a fluid pressure servomotor comprising a movable wall provided with an internal chamber having spaced forwardly and rearwardly positioned opposed end walls, a movable control member carried by said forwardly positioned wall and projecting into said internal chamber, a projection on said rearwardly positioned wall extending into said chamber toward said movable control member, an annular diaphragm in said chamber extending between said projection and the side walls of said chamber to provide forwardly and rearwardly positioned opposed chambers adjacent the forwardly and rearwardly positioned opposed end walls respectively, valve means in said movable wall and operated by said movable control member for regulating the pressure supplied to one opposed chamber thereby producing differential pressure across said diaphragm, said valve means being constructed and arranged such that movement of said movable control member into said forwardly positioned opposed chamber causes said diaphragm to be moved away from said control member, an abutment surface carried by said movable control member, a plurality of generally radially extending levers in said forwardly positioned opposed chamber, said levers being adapted to be pulled at their radially outer end by said diaphragm and being adapted to be abutted on their radially inner ends by said abutment surface of said control member, and abutment surfaces carried by said movable wall for pivotally abutting said levers intermediate their ends, whereby rearward movement of said diaphragm forces the inner ends of said levers against said abutment surface of said movable control member.

References Cited in the file of this patent
UNITED STATES PATENTS

| | | |
|---|---|---|
| 1,620,513 | Bragg et al. | Mar. 8, 1927 |
| 2,275,697 | Stelzer | Mar. 10, 1942 |
| 2,307,910 | Baade | Jan. 12, 1943 |